Sept. 20, 1960                J. WERNER                    2,953,287
              RETRACTABLE PACKAGE CARRIER FOR AUTOMOBILE TRUNKS
Filed Feb. 11, 1958                                 4 Sheets-Sheet 1
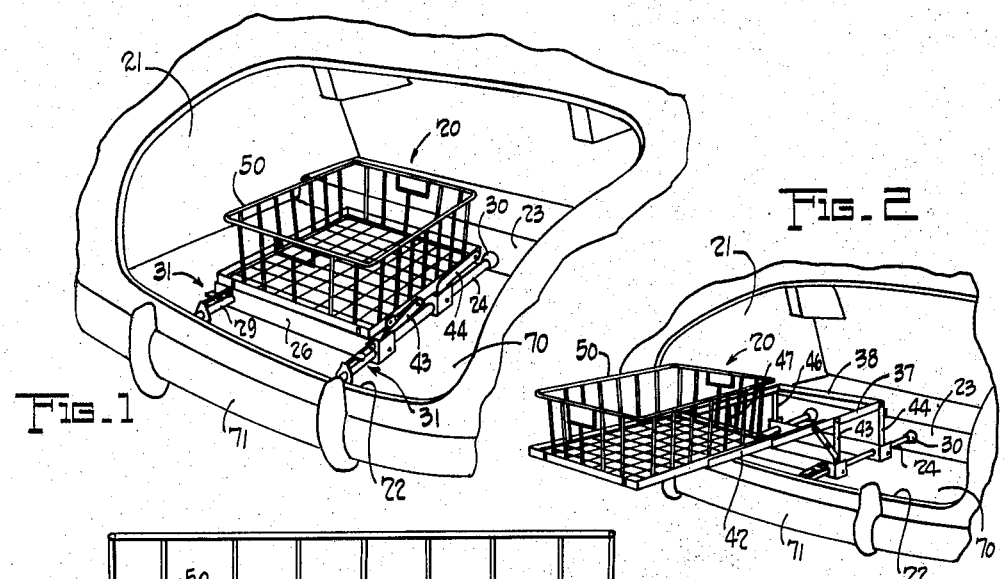
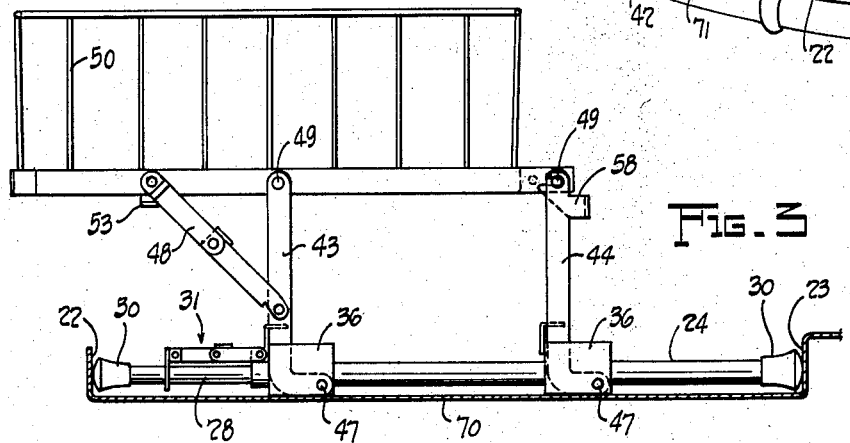
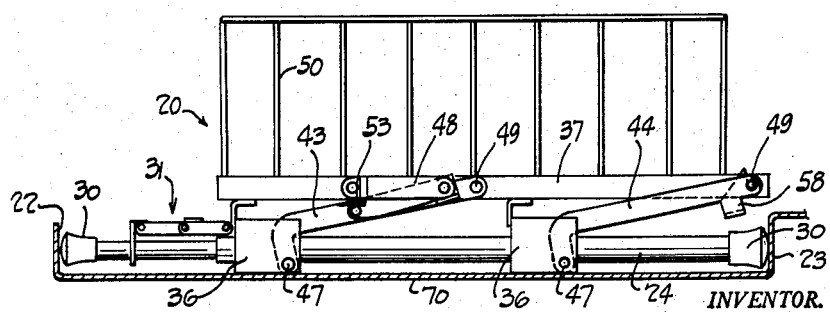
INVENTOR.
JOHN WERNER
BY
Sanford Schumacher
ATTORNEY.

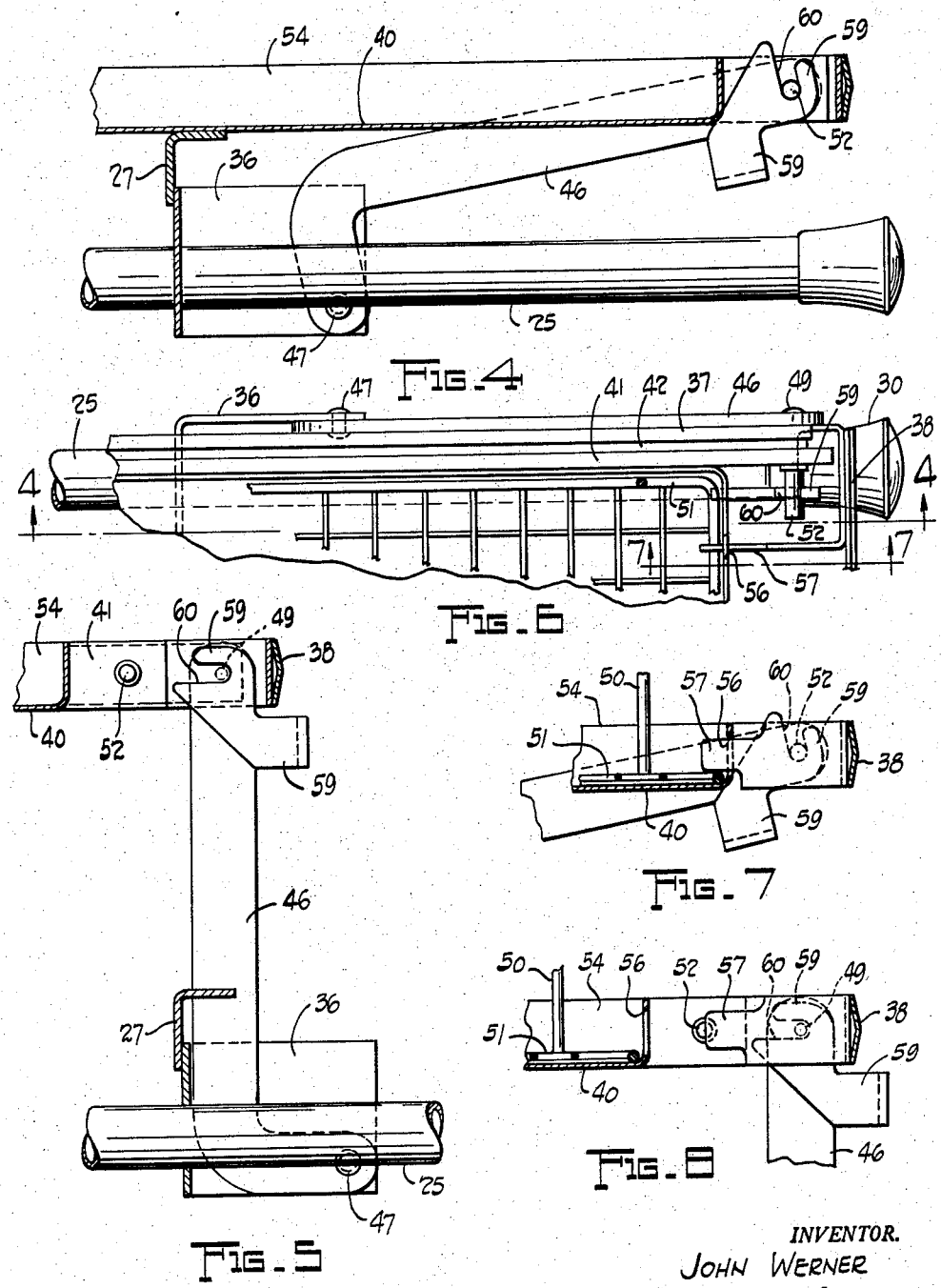

Sept. 20, 1960   J. WERNER   2,953,287
RETRACTABLE PACKAGE CARRIER FOR AUTOMOBILE TRUNKS
Filed Feb. 11, 1958   4 Sheets-Sheet 3
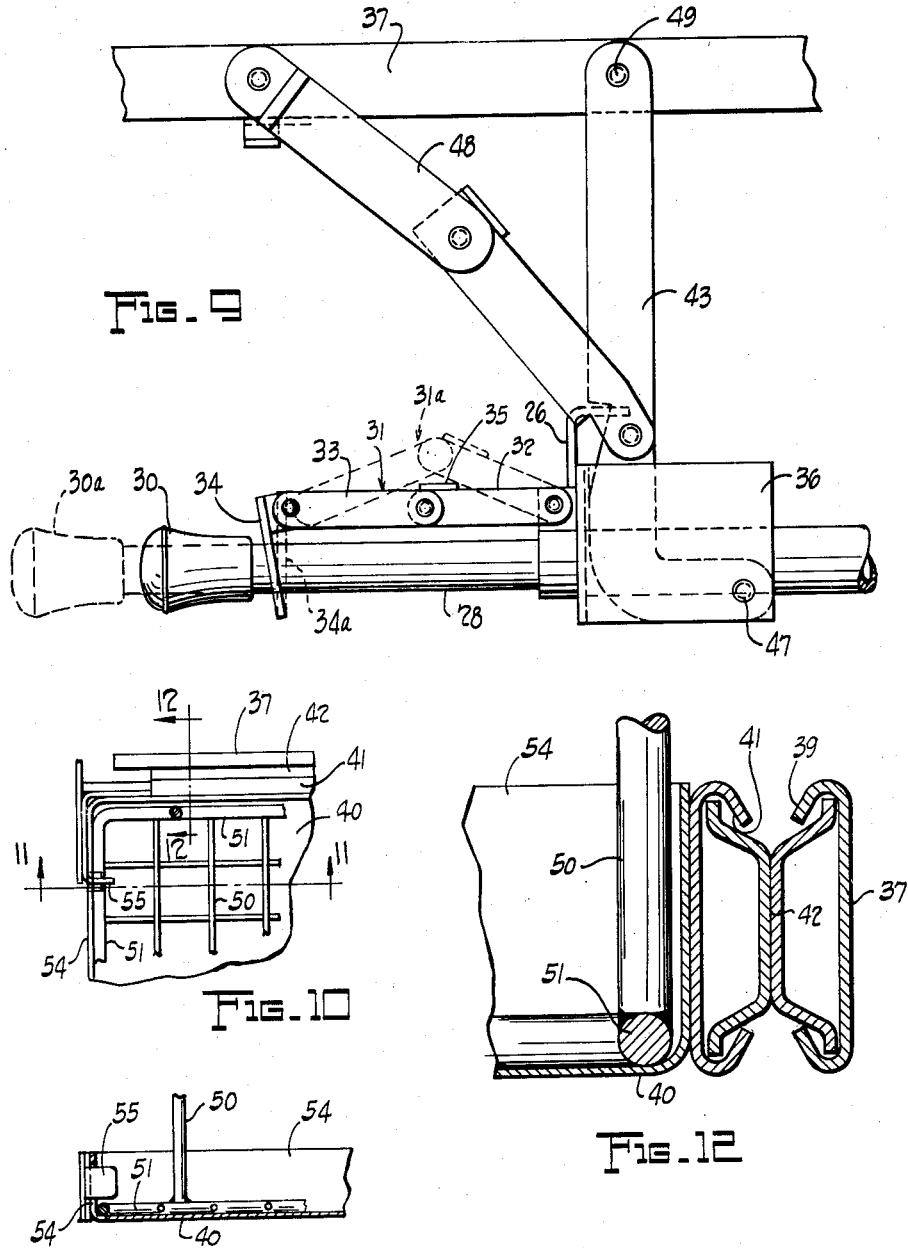
INVENTOR.
JOHN WERNER
BY
Sanford Schnurmacher
ATTORNEY

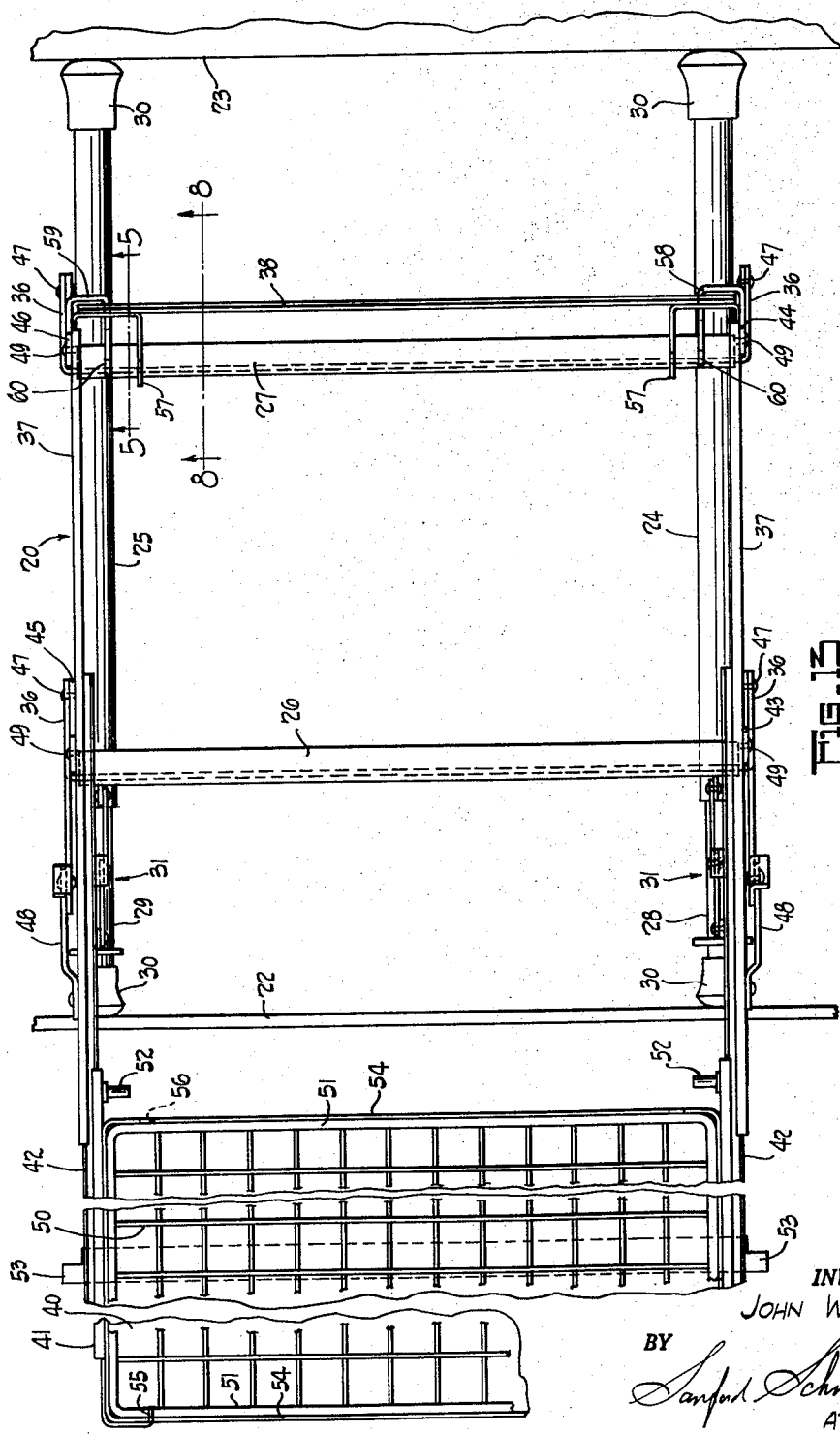

United States Patent Office 2,953,287
Patented Sept. 20, 1960

2,953,287

RETRACTABLE PACKAGE CARRIER FOR AUTOMOBILE TRUNKS

John Werner, Maple Heights, Ohio, assignor to Schofield Manufacturing Company, Cleveland, Ohio, a corporation of Ohio Filed Feb. 11, 1958, Ser. No. 714,582

6 Claims. (Cl. 224—42.44)

This invention relates to package and article carriers and particularly to a retractable package carrier for automobile trunks.

The primary object of this invention is to provide a structure, mountable in the trunk of an automobile and having a platform or table for supporting packages, or other articles, that is swingable from a position on the floor of the trunk to a position in which the platform extends rearwardly of the trunk opening and over the rear bumper of the automobile; and is then as easily swung back to its position on the trunk floor.

Another object is to provide a device of the type stated, adapted for use in automobile trunks whose floors are below the rear sill of the body, having a platform that is slidably mounted on a track that can be raised to a position above the sill and then pulled longitudinally of said track to a position beyond the sill and to the rear of the trunk, for easy access.

Another object is to provide a device of the type stated whose slidable platform is locked against horizontal movement along said track when in its retracted position, but is free to move longitudinally of said track when in its raised position.

A further object is to provide a device of the type stated having a package holding basket, or container, resting on said platform that is freely removable therefrom when the platform is in its extended position but is automatically locked against removal therefrom, when the platform is in its retracted position.

Another object is to provide a device of the type stated that is portable in character, but adapted to be easily and securely mounted in any existing automobile trunk.

Still another object is to provide a device of the type stated that is rugged in construction, reliable in operation and well adapted to the use intended.

These and other objects of the invention will become apparent from a reading of the following specification and claims together with the accompanying drawings, wherein:

Figure 1 is a perspective view of the retractable package carrier, that is the subject of this invention, as it appears mounted in the trunk of an automobile body, in its retracted position;

Figure 2 is a perspective view of the same, showing the package carrier in its extended position;

Figure 3 is a side elevation of the device showing its package supporting platform in its raised position;

Figure 3A is a side elevation showing the package supporting platform in its retracted position;

Figure 4 is a view, partly in section taken along the line and in the direction of the arrows 4—4 of Figure 6;

Figure 5 is an enlarged view taken substantially along the line and in the direction of the arrows 5—5 of Figure 13, showing the platform disengaged from the leg lock, as it appears at the start of its outward movement toward its extended position;

Figure 6 is an enlarged plan view of the left forward corner of the device, in its retracted position, as illustrated in Figure 1;

Figure 7 is a view taken along the line and in the direction of the arrows 7—7 of Figure 6;

Figure 8 is a view taken substantially along the line and in the direction of the arrows 8—8 of Figure 13, showing the automatic basket clamp disengaged from the basket, as it appears at the start of the outward movement of the platform toward its extended position;

Figure 9 is an enlarged view of the rear end of the base showing the leg lock in alternate positions;

Figure 10 is an enlarged top plan view of the left rear corner of the platform and basket in the retracted position illustrated in Figure 1;

Figure 11 is a view of the same taken along the line and in the direction of the arrows 11—11 of Figure 10;

Figure 12 is a cross-sectional view of the frame, tracks and platform taken along the line and in the direction of the arrows 12—12 of Figure 10; and Figure 13 is a top plan view of the device in its fully extended position.

Referring more particularly to the drawings, there is seen in Figures 1 and 2 the retractable package carrier that is the subject of this invention, broadly indicated by reference numeral 20, as it appears mounted within a conventional automobile trunk 21, in alternate retracted and fully extended positions, respectively.

The trunk cavity 21 is closed by the usual cover, not illustrated, when the carrier 20 is in its retracted position, as seen in Figure 1.

Reference numerals 26 and 27 indicates two spaced angle irons which are welded cross-wise of two spaced and parallel tubes 24 and 25 to form a base for the carrier which rests on the floor 70 of the trunk 21.

A second pair of tubes 28 and 29 are telescopically mounted within the tubes 24 and 25, respectively, as seen in Figure 13. Each tube has a foot 30 at its outer end. The base is rigidly locked into position on the trunk floor 70, as seen in Figures 3, 3A and 13, by placing the feet 30 of the tubes 24 and 25 against the front sill 23 of the trunk 21, and then moving the rear tubes 28 and 29 until their feet 30 contact the rear sill 22. The so positioned base is then wedged in place between the front and rear sills by means of the two toggle locks 31, described in detail hereinafter.

As employed herein, the words "front" or forward and "rear" or "back" refer to the relative positions of the indicated structural elements with reference to the front and rear of the automobile trunk within which they are shown mounted.

Reference numerals 43, 44, 45 and 46 indicate four L-shaped legs. Each leg is pivotably mounted on anchor plates 36 by means of a pivot pin 47. Each L-shaped leg is so pivotably mounted at the end of its short section, as seen most clearly in Figures 3 and 3A.

Two spaced and parallel strips 37 having in-faced tracks 39, formed integral therewith, and joined at their forward ends by a cross-piece 38 form a frame which is supported at the top ends of the long sections of the L-shaped legs 43, 44, 45 and 46 through pivot pins 49.

The tracks 39 are open to the rear of the frame and closed at their forward ends by the cross-piece 38. An intermediate double faced track 42, of a length equal to that of the tracks 39, is slidably mounted on each track 39 and is movable longitudinally thereof between the approximate midpoint thereof and the cross-piece 38.

A table or platform 40, having a bounding rim 54 and parallel side tracks 41, is slidably mounted between the two intermediate tracks 42, as is seen most clearly in Figures 12 and 13, and is slidable longitudinally thereof between points coinciding with the front ends of the tracks 42 and the approximate midpoints thereof.

The platform has two in-faced lock rods or bars 52 at either side, positioned immediately ahead of the front edge thereof, as illustrated most clearly in Figure 13.

Reference numerals 58 and 59 indicate platform lock heads mounted on the legs 44 and 46 respectively. The heads 58 and 59 are faced toward the rear and have slots 60 which are perpendicular to the long axes of their respective legs 44 and 46. The slots 60 lie in the plane of the line of travel of the platform lock rods 52 when the legs are in their raised or vertical positions, as seen in Figures 3, 5, 8 and 13, and when so positioned are adapted to receive the lock rods 52 therein.

When the legs 44 and 46 are in their retracted or substantially horizontal positions, as seen in Figures 3A, 4, 6 and 7, the slots 60 lie in a plane substantially perpendicular to the line of travel of the engaged lock rods 52 and lock the platform 40 against horizontal movement, as is most clearly illustrated in Figure 7.

Reference numeral 50 indicates a wire basket having a base rim 51 that is adapted to fit snugly within the rim 54 of the platform 40. The wire basket is removable from the platform 40 and may be used to transport packages to and from the platform 40. This is especially helpful when a large number of bags and packages are involved, as is the case when the housewife is transporting groceries home on her weekly shopping trips.

Reference numeral 55 indicates two spaced fingers extending inwardly from the rear face of the platform rim 54 and adapted to be positioned over the basket base 51 to hold same against vertical movement on the platform 40, as seen in Figures 10 and 11.

The forward face of the rim 54 has two spaced slots 56 which are adapted to receive two clamp fingers 57, mounted on the cross-piece 38 of the frame, as is seen most clearly in Figure 13.

When the platform 40 is in its retracted position, illustrated in Figures 1, 3A, 4, 6 and 7, the fingers 57 extend through the platform rim slots 56, over the basket base 51, to lock forward end of the basket against vertical movement relative to the platform 40, as is most clearly seen in Figure 7.

In installing the carrier 20 in a car trunk 21 as described hereinbefore the base feet 30 are wedged against the front and rear sills 23 and 22 respectively, by means of the toggle locks 31 which are mounted on each of the rear telescopic tubes or base legs 28 and 29 as seen most clearly in Figures 9 and 13. Each lock 31 comprises two links 32 and 33. The link 32 is anchored on the base angle iron 26 and the link 33 is anchored to a toggle plate 34 through which the tubes pass. A thumb pad 35 is located at the junction between the two links. When the lock is lifted to the position 31a, illustrated in Figure 9, the toggle plate 34a is loose on the tube 28. The shoe 30 can then be moved into adjusted positions 30a in order to place all the shoes against their respective sill bearing surfaces. Then, upon pressing down on the thumb pad 35, the links are made to line up in a straight line which causes the toggle plate 34 to dig into the tube 28 and lock it in place. By the proper adjustment and locking of the two telescopic tubes 28 and 29 the unit 20 can be wedged into secure engagement with the trunk sills.

Assuming that the unit 20 is mounted in the trunk 21 in its retracted position, as illustrated in Figure 1, the following conditions prevail: The frame supporting legs 43, 44, 45 and 46 are pivoted forward into a substantially horizontal, as seen in Figure 3A. The platform 40 is positioned within the area of the frame, against the forward cross-piece 38, with its lock rods 52 nested within the slots 60 of the lock heads 58 and 59, as seen in Figure 7. The basket 50 is securely locked to the platform by means of the fingers 55 and 57 which are positioned over the basket base 51, as seen in Figures 7 and 11.

In order to swing the platform 40 to the fully extended position illustrated in Figure 2, wherein the platform is positioned to the rear of the trunk 21 and above the bumper 71, it is only necessary to pull upward and rearward on the platform 40. Due to the fact that the platform is locked to the legs 44 and 46 through the lock rods 52 in the head slots 60 there can be no horizontal movement of the platform along the frame tracks 39, at first. As a result the rearward pull on the platform 40 causes its supporting legs 43, 44, 45 and 46 to pivot on their base pins 47 to the vertical position illustrated in Figures 2, 3, 5 and 9.

It should be noted that the platform cannot be pulled out along the tracks 39 and 42 until the legs 43, 44, 45 and 46 are pivoted to their fully vertical positions.

This action raises the platform 40 vertically to a position higher than the rear trunk sill 22 and the rear bumper 71.

At the same time the lock head slots 60 have pivoted on the platform lock rods to the horizontal position shown in Figure 5, thereby leaving the rods 52 free to move out of the slots 60.

In order to prevent accidental retraction of the legs; two folding braces 48 are mounted between the frame sides 37 and the rear legs 43 and 45.

The so raised table 40 is now free to be pulled along the tracks 39 and 42 to the extreme rearward position illustrated in Figures 2 and 13. At the same time that the platform 40 was moved rearwardly along the tracks 39 and 42 it also moved away from the fingers 57, as seen in Figure 8, thus leaving the forward edge of the basket base 51 free of restraint. The so released basket 50 can now be removed from the platform 40 by raising the front edge of its base 51 clear of the platform rim 54, and then moving the basket forward to clear its rear edge from under the fingers 55.

In its fully extended position the platform and its supported basket are easily accessible, without requiring any stooping or reaching on the part of the user.

As stated hereinbefore, the basket may be removed to a distant point for filling. The filled basket is then replaced on the platform and re-engaged with the fingers 55. The platform 40 is then pushed into the trunk along the tracks 42 and 39, into alignment with the frame sides 37.

Reference numeral 53 indicates a laterally extending lug positioned on either side of the platform and so located that as the platform is slid into alignment with the frame side 37 it will strike and break the folding braces 48, as shown in Figure 9. Further forward pressure on the platform will cause the legs 43, 44, 45 and 46 to pivot forward and downward to their fully retracted positions, wherein the platform is again locked against horizontal movement by the engagement of the rods 52 with the slots 60. At the same time the basket base 51 is re-engaged by fingers 57, thereby assuring that the basket will always remain in position on the platform under extreme conditions of vibration and road shock.

It is of course to be understood that the platform can be used without the basket 50 to carry luggage or similar bulky articles.

While the device, as illustrated, occupies less than the full width of the trunk, it is to be understood that it could be built the full width of the trunk opening, so as to provide a maximum of storage area.

It will now be clear that there is provided a device which accomplishes the objectives heretofore set forth. While the invention has been disclosed in its preferred form, it is to be understood that the specific embodiment thereof, as described and illustrated herein, is not to be considered in a limited sense as there may be other forms or modifications of the invention which should also be construed to come within the scope of the appended claims.

I claim:
1. A retractable package carrier for automobile trunks, comprising in combination, a base member adapted to be mounted on the bed of the trunk, a rectangular frame member having a track-way open to the rear of the trunk, supported on paired front and rear legs pivotally mounted on the base member, the legs being swingable between a first substantially horizontal position wherein the frame is retracted upon the base, and a second, vertical position, wherein the frame is raised in a horizontal plane to an extended position above the base, a platform mounted on said frame track-way and slidable therealong between a first position, co-extensive with the frame, and a second position, substantially beyond the rear of said frame and trunk, a package holding container mounted on said platform and removable therefrom when the platform is in other than its first position, the platform having spaced fingers at its rear edge engageable with the base of the container, the frame having rearwardly extending spaced fingers at its forward edge engageable with the base of the container when the platform is in its first position, whereby the so engaged container is locked against removal from the platform, a lock bar mounted at the front end of the platform, and a lock head mounted on one of the front legs and having a slot therein perpendicular to the long axis of the leg, the slot being aligned with and adapted to receive the platform lock bar therein when the leg is in its second position, the slot being cross-wise of the engaged lock bar when the leg is in its first position, to restrain the platform against horizontal movement along the track-way when the frame is in its retracted position.

2. A device of the type defined in claim 1 and further distinguished by the base member having forwardly and rearwardly extensible feet engageable with the front and rear sills of the trunk, and lock means mounted on said base and engageable with said feet to hold them in adjusted pressed engagement against said sills, whereby the base is immovably positioned on said trunk bed.

3. A retractable package carrier for automobile trunks, comprising in combination, a base member adapted to be mounted on the bed of the trunk, a rectangular frame member having a track-way open to the rear of the trunk, supported on paired front and rear legs pivotally mounted on the base member, the legs being swingable between a first substantially horizontal position wherein the frame is retracted upon the base, and a second, vertical position, wherein the frame is raised in a horizontal plane to an extended position above the base, a platform mounted on said frame track-way and slidable therealong between a first position, co-extensive with the frame, and a second position, substantially beyond the rear of said frame and trunk, a package holding container removably mounted on said platform, a lock bar mounted at the front end of the platform, and a lock head mounted on one of the front legs and having a slot therein perpendicular to the long axis of the leg, the slot being aligned with and adapted to receive the platform lock bar therein when the leg is in its second position, the slot being cross-wise of the engaged lock bar when the leg is in its first position, to restrain the platform against horizontal movement along the track-way when the frame is in its retracted position.

4. A device of the type defined in claim 3, and further distinguished by the base member having forwardly and rearwardly extensible feet engageable with the front and rear sills of the trunk, and lock means mounted on said base and engageable with said feet to hold them in adjusted pressed engagement against said sills, whereby the base is immovably positioned on said trunk bed.

5. A retractable package carrier for automobile trunks, comprising in combination, a base member adapted to be mounted on the bed of the trunk, a rectangular frame member, having a track-way open to the rear of the trunk, supported on paired front and rear legs pivotally mounted on the base member, the legs being swingable between a first substantially horizontal position wherein the frame is retracted upon the base, and a second, vertical position, wherein the frame is raised in a horizontal plane to an extended position above the base, a platform mounted on said frame track-way and slidable therealong between a first position, co-extensive with the frame, and a second position, substantially beyond the rear of said frame and trunk, a lock bar mounted at the front end of the platform, and a lock head mounted on one of the front legs and having a slot therein perpendicular to the long axis of the leg, the slot being aligned with and adapted to receive the platform lock bar therein when the leg is in its second position, the slot being cross-wise of the engaged lock bar when the leg is in its first position, to restrain the platform against horizontal movement along the track-way when the frame is in its retracted position.

6. A device of the type defined in claim 5, and further distinguished by the base member having forwardly and rearwardly extensible feet engageable with the front and rear sills of the trunk, and lock means mounted on said base and engageable with said feet to hold them in adjusted pressed engagement against said sills, whereby the base is immovably positioned on said trunk bed.

References Cited in the file of this patent

UNITED STATES PATENTS

| Number | Name | Date |
|---|---|---|
| 696,565 | Horrocks | Apr. 1, 1902 |
| 851,659 | Gaaikema | Apr. 30, 1907 |
| 1,726,257 | Carlisle | Aug. 27, 1929 |
| 2,348,640 | Oneal | May 9, 1944 |
| 2,524,386 | Johnston | Oct. 3, 1950 |
| 2,547,083 | Lundgren | Apr. 3, 1951 |
| 2,576,385 | Bigsby | Nov. 27, 1951 |